United States Patent [19]
Lynn et al.

[11] Patent Number: 5,817,260
[45] Date of Patent: Oct. 6, 1998

[54] METHOD OF USING A HEATED METERING DEVICE FOR FOAM PRODUCTION

[75] Inventors: Gregory W. Lynn, Clearwater, Fla.; William J. Cole, Berlin, N.J.

[73] Assignee: Celotex Corporation, Tampa, Fla.

[21] Appl. No.: 752,104

[22] Filed: Nov. 20, 1996

[51] Int. Cl.$^6$ .......................... B29C 44/28; B29C 44/30
[52] U.S. Cl. ................ 264/40.6; 264/46.2; 264/46.3; 264/46.5
[58] Field of Search ................... 425/4 C, 143; 264/46.2, 46.3, 46.5, 40.6

[56] References Cited

U.S. PATENT DOCUMENTS

| | | | |
|---|---|---|---|
| 3,140,512 | 7/1964 | Hausman | 18/2 |
| 3,182,587 | 5/1965 | Woodhall | 100/47 |
| 3,681,485 | 8/1972 | Lieberman | 264/46.3 |
| 3,959,049 | 5/1976 | Tanaka et al. | 156/79 |
| 4,255,105 | 3/1981 | Hoffmann et al. | 264/46.3 |
| 4,318,761 | 3/1982 | Dockray et al. | 264/46.2 |
| 4,370,923 | 2/1983 | Schmidt | 100/47 |
| 4,495,013 | 1/1985 | Walker et al. | 156/79 |
| 4,573,402 | 3/1986 | Sharma et al. | 100/38 |
| 4,653,395 | 3/1987 | Verkasalo | 100/38 |
| 4,685,389 | 8/1987 | Boissevain | 100/93 |
| 4,748,906 | 6/1988 | Ashmore | 100/93 |
| 5,020,984 | 6/1991 | Cloeren et al. | 425/143 |
| 5,049,420 | 9/1991 | Simons | 427/361 |
| 5,254,301 | 10/1993 | Sessions et al. | 264/46.3 |
| 5,375,988 | 12/1994 | Klahre | 264/46.2 |

FOREIGN PATENT DOCUMENTS

| | | | |
|---|---|---|---|
| 56-113438 | 9/1981 | Japan | 264/46.3 |

*Primary Examiner*—Allan R. Kuhns
*Attorney, Agent, or Firm*—Charles W. Vanecek

[57] ABSTRACT

A plastic foam-forming mixture, e.g. a polyurethane or polyisocyanurate foam mix, deposited on a carrier, is metered through two spaced opposed members forming therebetween a metering gap. At least one of the members is malleable through changes in temperature so that the profile of the metering gap can be variously defined. Foam boards having a highly uniform thickness are thereby continuously and expeditiously producible.

20 Claims, 3 Drawing Sheets

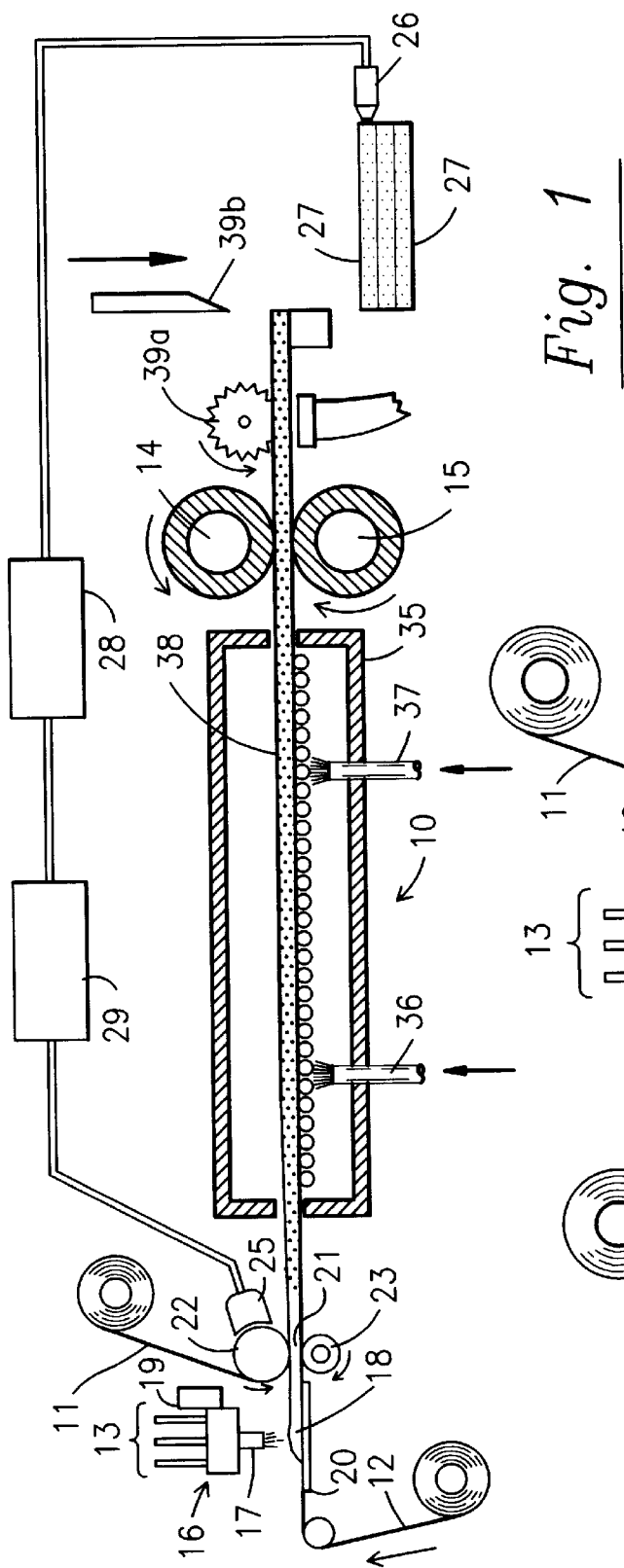
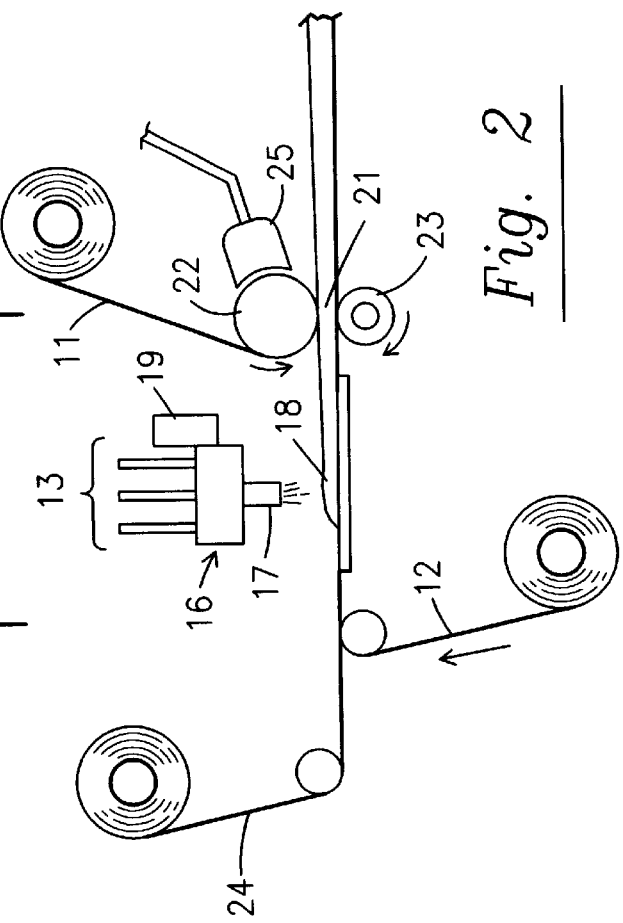
Fig. 1
Fig. 2

METHOD OF USING A HEATED METERING DEVICE FOR FOAM PRODUCTION

BACKGROUND OF THE INVENTION

1. Field of the Invention

This invention relates to the manufacture of panels of plastic foam, and particularly to a method and apparatus for imparting a uniform thickness to the panels without diminishing the requisite properties of the panels.

2. Description of the Prior Art

Methods for the continuous production of a rigid insulating polymeric foam board comprising a foam layer sandwiched between facing materials are well known. Such boards are typically used in the construction of walls, ceilings, roofs and the like. In the production, a foam-forming mixture is customarily delivered between two continuous webs of sheet material which are transported through various processing stations.

In order to avoid a substantial waste of material, it is highly desirable that the foam boards be produced with a substantially rectangular cross-section, and without a round top or other nonuniformity in the boards' dimensions. Heretofore a commonly practiced method for controlling the caliper or thickness of the boards has been the so-called "restrained rise" type. Here the foamable material and facers are directed between flatness-promoting confining means, such as a pair of spaced conveyor belts, which suitably are positioned apart a distance less than the thickness the combination of foam and facers would otherwise reach if allowed to expand unrestrictedly.

Another conventional method for continuously producing plastic foams is the "free rise" type, such as disclosed in U.S. Pat. No. 4,028,158, wherein the thickness of the finished foam board is controlled by passing the foamable mixture and facers through a metering gap which is preferably provided by the nip of two rotating rolls. Although this metering means avoids the time-consuming and cumbersome operation involved in using the conveyors of the restrained rise system, the caliper variation in the cross direction of foam boards produced on free rise lines, especially the thicker boards, turns out to be considerably greater than that of "restrained rise" boards. It would be highly desirable if a method and apparatus could be found for producing foam boards having a high degree of uniformity in caliper across the board, combined with the other properties required in such boards without sacrificing the speed and efficiency which characterize free rise foam production lines.

OBJECTS OF THE INVENTION

It is accordingly an object of the present invention to provide a rigid or flexible plastic foam having a highly uniform thickness over its entire width and a combination of overall good properties and an improved method and apparatus for producing the foam.

It is another object of the present invention to produce a rigid foam plastic, particularly a polyurethane or polyisocyanurate foam, which has a highly uniform thickness and overall good properties, including excellent thermal insulative properties, low friability and good dimensional stability, thermal resistance and compressive strength.

It is still another object of the present invention to provide an apparatus and method for thermally controlling the metering device in free rise foam manufacture and thereby regulating the thickness of the resultant foams.

It is a further object of the present invention to provide closed cell foam materials which can be used in building panels which are highly insulating, thermally resistant, low in friability, and soundproof.

SUMMARY OF THE INVENTION

The foregoing and other objects of the invention have been achieved by the process and apparatus of the present invention for the continuous production of a plastic foam structure, wherein a foam-forming mixture is applied from a dispenser to a moving carrier and a heated metering device is employed for metering the mixture and uniformly distributing it on the carrier, which may be a flexible or rigid material. Another moving material is suitably placed over the deposited mixture so that the finished product will advantageously have a plastic foam core sandwiched between the upper and lower facing materials. The apparatus includes a conveyor assembly for continuously advancing the facing materials, which may optionally be removable to yield a finished unfaced foam. The metering device advantageously comprises two spaced opposed members forming therebetween a metering nip or gap and capable of constricting a liquid mixture passed through the gap.

Various shapes and materials of construction, e.g., rolls, bars or plates made of steel or other metals, may be used in the makeup of the constricting members of the metering device. Advantageously, the upper member of the metering device is a cylindrical roller, and generally both the upper and lower members are cylindrical rollers. At least one of the constricting members is made from material which expands and contracts with changes in temperature, and during the foam-forming process of the invention this member may be heated and/or cooled across its length to influence its cross-directional profile and concomitantly the caliper of the final product. The metering member(s) may be heated and/or cooled internally or externally, or by both internal and external means. By locally heating or cooling different portions or zones along the metering member, these portions or zones are made to expand or contract so as to effect overall control of the thickness of the metering member and in turn of the finished foam product. In this way, a highly flat or other desired product profile may be obtained.

In the foam production, the dispenser suitably deposits the foamable mixture onto at least one of two advancing sheets, and then the heated metering device, which comprises, for example, two closely spaced parallel rollers located one above the other, causes the sheets to converge into proximate relationship with the foamable mixture sandwiched between them. The upper sheet advantageously passes around the upper roller which is maintained at a regulated distance from the lower roller so that the rollers serve as a thickness controlling means for the foam-forming mixture. One or both of the rollers may be heated for the desired, preferably even, distribution of the mixture across the width of the sheets as the sheets converge and pass through the nip of the metering device. The heating of the metering device is found to eliminate the uneven panel thicknesses which have resulted from the use of unheated devices in the past.

A power controller, which may include a computer, can control the heating of each zone of the metering member(s) of the invention to maintain a uniform thickness of foam product. A sensor measures the thickness of the foam product at intervals along its width and generates signals corresponding to these measured thicknesses. These signals are fed to the power controller which compares each measured thickness with a desired thickness and adjusts the amount of power supplied for heating or cooling and thereby controlling the constricting nip of each zone of the temperature sensitive metering member.

After passing through the gap defined by the metering means, the faced foam-forming mixture advances into an expansion zone wherein the foam-forming mixture expands to the cured state. In the expansion zone, the mixture can be subjected to the influence of heat controllably added by the circulation of hot air and cured to the finished foam structure. The foam may then be periodically severed into finite lengths for commercial use.

The invention is particularly useful in the production of foam boards having a rigid plastic foam core which may be formed from any suitable plastic foam-forming composition. The invention, however, is also applicable to flexible foams. Of especial interest are foam cores consisting of an isocyanate-based foam material, including polyurethane and polyisocyanurate foams.

BRIEF DESCRIPTION OF THE DRAWINGS

The invention will now be described with reference to the accompanying drawings in which:

FIG. 1 is a schematic elevation of an apparatus suitable for practicing the free-rise process of the invention;

FIG. 2 is a schematic elevation of a portion of the apparatus of FIG. 1 showing a glass fiber mat being fed to the nip roll for reinforcement of the product;

DETAILED DESCRIPTION OF THE INVENTION

Figure 3:
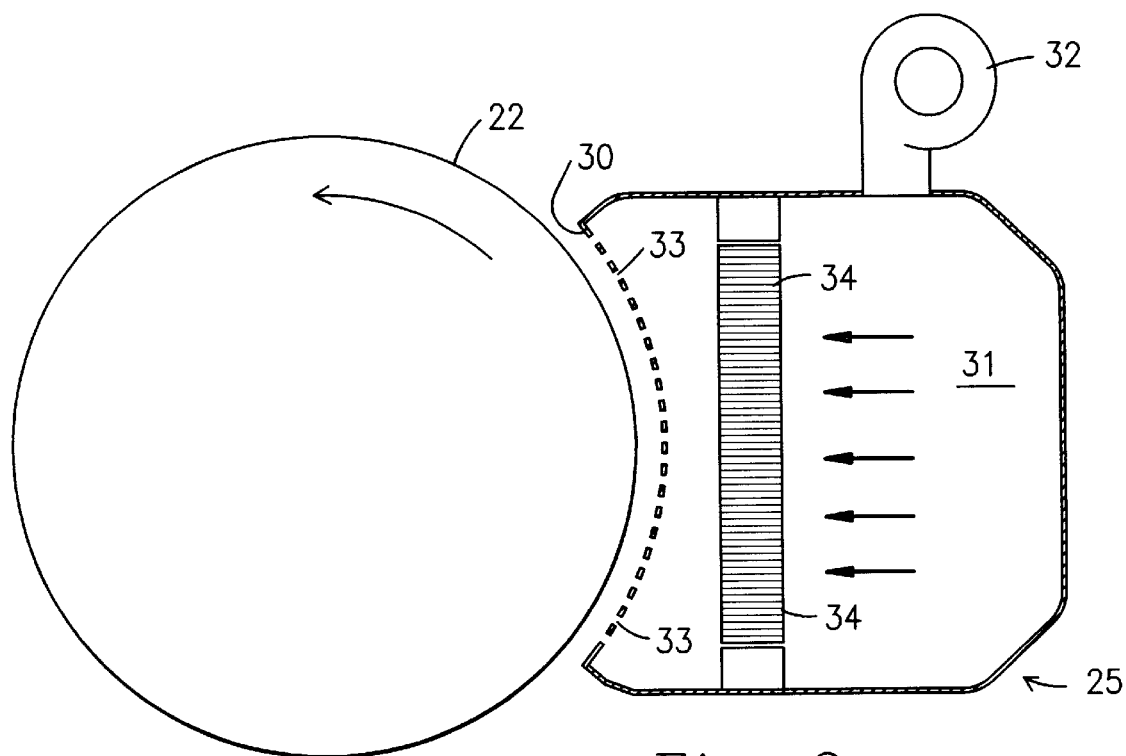
FIG. 3 is a schematic cross-sectional view of a temperature controller for heating and cooling one of the metering rolls of the apparatus of FIG. 1.
Figure 4:
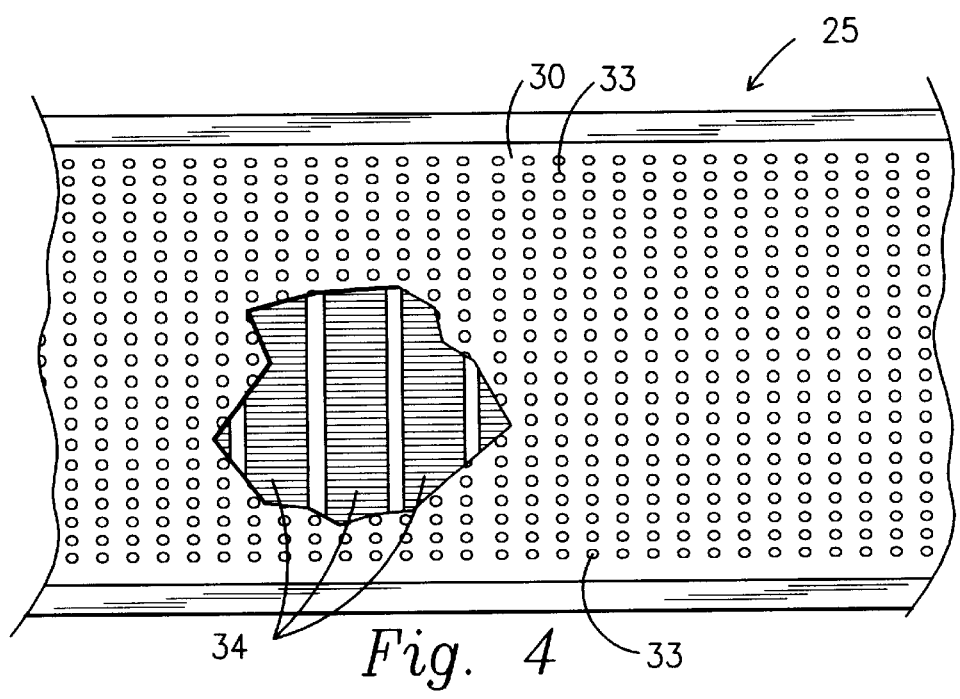
FIG. 4 is a fragmentary front elevational view of the temperature controller of FIG. 3.

Referring to FIG. 1, there is shown schematically an apparatus 10 of the invention suitable for the continuous production of foam plastic having a rectangular cross-section. Apparatus 10 includes means for advancing upper and lower facing materials or substrates 11 and 12 and means for applying a foam-forming mixture between the facing materials. The foam-forming ingredients are stored, pumped and metered by conventional equipment (not shown) and fed through a flexible conduit or conduits 13 for application on the production line. The foam-forming mixture is one which will result in a rigid, flexible or semi-rigid polymeric foam. Polymers that can be foamed in accordance with the invention include polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone.

The facing substrates may be composed of material which is flexible or rigid. Rigid facing materials can suitably be in the form of discrete sheets which are fed onto the production line in abutment. More conveniently, the facers are flexible material which is in the form of continuous or semicontinuous sheets fed from rolls. A wide variety of materials are employable as the facers. For example, the carrier substrate on the line can be a rigid or flexible material, such as perlite board, gypsum board, fiberboard, a metal sheet such as steel or aluminum, plywood, paper, paperboard, plastic foils, asphalt-saturated felt, a fiber glass sheet, an asphalt fiber glass sheet, etc., while the covering or upper facer is suitably a flexible material, such as asphalt-saturated felt, an asphalt fiber glass sheet, a fiber glass sheet, paper, paperboard, a metal or plastic foil, etc. The facers may be made from combinations of these materials.

As shown in FIG. 1, each of upper and lower facing sheets 11 and 12 is a flexible material which is fed from a supply roll. The apparatus 10 is also provided with pull rolls 14 and 15, and by virtue of rotation of these pull rolls sheets 11 and 12 are pulled from their supply rolls and onward along the production line. The foam-forming mixture, which advantageously is composed of polyurethane or polyisocyanurate foam forming chemicals, is delivered to a mixing head 16 and agitated therein. The mixed chemicals are then deposited from an applicator 17 onto advancing sheet 12. The chemicals can also be dispensed on sheet 11 or on both sheets.

Various application devices, both stationary and moving, may be employed in depositing the chemicals. Even distribution of the foamable mix over the surface of the sheet material can be achieved by dispensing the chemicals from applicators having one or more delivery heads. In one preferred embodiment, applicator 17 comprises a nozzle which is reciprocated transversely of the sheet 12 to supply a stream of a liquid foamable mixture 18 uniformly thereacross. The back and forth movement of the mixing head and applicator is caused by a reciprocating means 19. In another preferred embodiment involving the deposition of froth chemicals, the mixing head 16 deposits the foamable chemicals through an applicator capable of laying down a wide band of froth on lower sheet 12. Advantageously, this applicator can be oscillated transversely a short distance to either side of a central point above sheet 12.

As shown in FIG. 1, the start or upstream end of the production line beneficially includes a smooth-topped platform or bed 20 which extends from upstream of the deposition point of the foamable mixture to a point upstream of and adjacent the constricting nip 21 between closely spaced parallel rollers 22 and 23. Lower sheet 12 moves downstream in a horizontal plane along the upper surface of bed plate 20 positioned as illustrated in FIG. 1. Bed plate 20 is adjustably mounted so that it can be inclined from the horizontal to elevate its downstream transverse edge (adjacent nip 21) above its upstream transverse edge. An improved control of the foam chemical bank has been achieved by thus tilting the conveying sheet 12 so that it and foamable chemicals thereon advance with an upward slope upstream of the nip-defining rollers.

Immediately downstream of the laydown point of the foamable chemicals, upper facing sheet 11 is brought into contact with the top surface of the chemicals. As illustrated in FIG. 1, this contact is suitably effected by passing upper sheet 11 around roller 22 and through nip 21. In another favorable embodiment of the invention, the foamable mixture can be dispensed through applicator 17 onto the exposed surface of the sheet 11 as the latter passes around roller 22. In any event, between cylindrical rollers 22 and 23 the upper and lower facing sheets are brought together in surface-to-surface opposition relative to each other, with the foamable mixture sandwiched in between. As the facing sheets are brought into closely spaced adjacency between rollers 22 and 23, the constriction at nip or gap 21 causes a rolling bank of foamable mixture to build up, whereby there is a surplus or backlog of material available to pass through the nip of the rolls. One or both of rollers 22 and 23 are advantageously vertically shiftable for control of the thickness of the facers and foamable mixture passing through the nip.

The foam products of the invention can contain various reinforcement materials, such as a quantity of glass fibers. In FIG. 2, the apparatus is the same as that shown in FIG. 1 but here a reinforcing web 24 is being fed on top of facing sheet 12 into the apparatus. Alternatively, two reinforcing, webs can be used, each to the inside of a facing sheet. The web can be made from threads or yarns of any material which is non-flammable and dimensionally stable, particularly material which is stable to temperature changes. A preferred reinforcing web is a mat of fiberglass fibers. For example, the reinforcing web may be the type of glass mat used in producing the structural laminate of U.S. Pat. No. 4,028,158, i.e., a mat of long, generally straight glass fibers which are arranged in layers. As shown in FIG. 2, thin mat 24 of glass fibers is fed from a supply roll toward the nip 21 between the two rotating rollers 22 and 23. By virtue of rotation of pull roll 15, the lower sheet 12 and fibrous reinforcing mat 24 are pulled from their respective supply rolls. Sheets 11 and 12, having foam-forming mixture 18 and reinforcing mat 24 therebetween, pass through the nip 21 of rollers 22 and 23.

The nip or gap 21 formed between the rolls 22 and 23 is accurately adjustable so as to insure contact of the foamable mixture with the facing sheets and any reinforcing material and cause the desired, usually uniform, distribution of the mixture across the width of the sheets. Rolls 22 and 23 thus serve as a device to meter the amount of chemicals being passed downstream for formation of the desired board thickness. One or both of the metering rolls may be profiled in a known manner to locally vary the thickness of nip 21, e.g., by providing a reduced gap in the center to attain a concomitant reduction in the center of the foam core. Also, the intervening space between the rolls can be varied by movement of one or both of the rolls. For this purpose, upper roll 22 is suitably mounted on an adjustable support which permits the distance between its axis and the axis of lower metering roll 23 to be varied so that the nip between the rolls can be adjusted from a wide gap to almost a zero setting. This arrangement provides a high degree of control of the final thickness in the resulting foam board, with the foamable mixture being allowed to expand thereafter substantially freely to develop its natural rise profile. The metering rolls thus serve as a means for bringing the facing sheets into spaced conjunction, and for distributing the foamable mixture therebetween, as well as performing a final metering operation, supplementing the initial rough metering afforded by applicator 17.

It has been found that foam products manufactured on free rise lines are characterized by caliper variation in the cross direction despite the profiling of the metering rollers. The problem becomes more severe as the product increases in thickness. The present invention advantageously eliminates this caliper variation of free rise foam products by simply controlling the temperature of the metering roll(s) and hence the shape of the metering gap.

In a preferred embodiment of the present invention, illustrated in FIGS. 1–4, a temperature control device 25, which extends alongside the upper metering roll 22, selectively produces localized heating or cooling of roll 22. Roll 22 has a cylindrical outer mantle composed of a material which is expansible or contractible with changes in temperature. Device 25 includes heating and cooling means and means for delivering the desired temperature effect to the metering roll. The operation of device 25 is guided through use of the measured thickness of foam produced on the line. Advantageously, a sensor 26 measures the thicknesses of products 27 formed during production, and feeds these measured thicknesses to a computer 28. The computer and a power controller 29 regulate the operation of device 25 for localized temperature control of metering roll 22.

The housing of device 25 includes an axially elongated and cylindrically curved faceplate 30 whose concave front surface faces the outer surface of roll 22. The faceplate is positioned coaxially of the metering roll, with the front face of the faceplate being spaced in close proximity (e.g.,~½ inch) to the surface of the roll. Faceplate 30 profitably extends the entire length of the roll and has an arc length of about 25° or more, whereby an enclosed region of substantial area is formed between the faceplate and the roll.

A plenum chamber 31 is located behind the faceplate and pressurized room air or other gaseous fluid is introduced into the plenum chamber and toward the back face of the faceplate by blower 32. The air is continuously forced out at high velocity through a plurality of openings 33 in the faceplate. Suitable discharge openings 33 include elongated slots and circular apertures. In the embodiment illustrated in FIGS. 3 and 4, apertures 33 are arranged in numerous circumferentially spaced and axially extending rows. Spaced behind the faceplate are means for selectively heating the air passing through openings 33 to produce localized heating or cooling of the metering roll. This means may comprise a plurality of individually controlled heating elements 34 mounted behind faceplate 30 and toward the front of chamber 31 to heat the air delivered to the openings. The heating elements may comprise electrical resistance heating elements with a plurality of fins through which the air flows as it moves toward openings 33. The elements 34 suitably extend roughly perpendicularly to the radius of roll 22.

During operation of the invention, the blower 32 advantageously operates continuously to force air through all of the discharge openings 33. When localized heating of the metering roll is desired, the heating elements in the adjacent area of device 25 to be heated are energized to heat the air passing through the openings and thereby the adjacent area of roll 22 to be heated. The greater the amount of power applied to the heating elements 34, the hotter the air impinging against the metering roll 22 and the more the roll thermally expands. This decreases the local thickness of foam product 27.

When localized cooling of the metering roll is desired, less power is applied to the heating elements 34 in the adjacent area of device 25 or these heating elements are turned completely off. As the power to the heating elements is decreased, the adjacent area of metering roll 22 is subjected to a flow of colder air. This colder air causes the adjacent area of roll 22 to contract, thereby increasing the local nip spacing 21 and producing a thicker section of foam product 27.

After the faced foam-forming mixture goes between the nip of the two rolls 22 and 23, it passes into oven 35 and on along the generally horizontally extending production line, as shown in FIG. 1. Oven 35 provides an expansion zone for the foam-forming mixture, which in this embodiment is a polyurethane or polyisocyanurate foam-forming mix. By varying the temperature of hot air from vents 36 and 37, the temperature within the oven 35 is maintained within the desired limits of 100° F. to 300° F., and preferably 175° F. to 250° F. The foam, under the influence of the heat added to the oven, cures to form faced foam plastic 38. The product 38 then leaves the oven 35, passes between the pull rolls 14 and 15, and is cut by side edge and length cutting means 39a and 39b into finite lengths, thereby forming discrete panels 27 of the product.

The present invention is further illustrated by the following example in which all parts and percentages are by weight unless otherwise indicated.

EXAMPLE

This example illustrates, by reference to the drawings, the production of insulation boards in a free-rise process utilizing a heated metering roll.

The following isocyanurate formulation was used in preparing the foam core of the insulation boards.

| Foam-Forming Ingredients | Parts by Weight |
|---|---|
| Polymethylene polyphenylisocyanate having an equivalent weight of 138. | 185.7 |
| Aromatic polyester polyol having an equivalent weight of 236. | 114.3 |
| Blowing Agent | 42.0 |
| Surfactant | 2.2 |
| Catalyst | 5.0 |

As illustrated in FIG. 1, a 50.5" wide trilaminate facer 11 and a 51.5" wide trilaminate facer 12 were fed toward the nip of 49" wide metering rolls 22 and 23. The cylindrical outer mantle of each metering roll was composed of chrome-plated steel. Oven 35 was heated to provide a zone above vent 36 at a temperature of about 195° F., and a zone above vent 37 at about 180° F. The above-mentioned foam-forming ingredients were thoroughly mixed in mixing head 16 and deposited through nozzle 17 onto lower facer 12 just upstream of the nip of the metering rolls. Upper facer 11 passed around upper metering roll 22, which was slightly crowned, having a diameter of 10.002 inches at its center and tapering to a diameter of 10 inches at each end.

Control of the temperature of roll 22 was provided by an experimental temperature control device 25, which was one foot wide and had eight 1½" heating zones. Control device 25 was positioned coaxially and centrally of roll 22 with its concave front surface 0.45±0.05 inch from the opposed convex surface of the roll. The facing sheets 11 and 12 having the foam-forming mixture 18 therebetween passed from the upstream end of the apparatus through the nip 21 of the two rotating metering rolls 22 and 23 and on downstream. The distance between rolls 22 and 23 was preset to produce boards having an average thickness of 1⅞ inches.

At the beginning of the production run and before the heat source of device 25 was energized, the blower 32 was turned on. Next, at the two minute point the heat source was activated at full power across device 25. At the twelve minute point, the power for the heat source was turned off and device 25 cooled. At each elapsed time of the run shown in the following Table I, a sample foam board 27 from the run was selected for thickness measurements in the transverse direction across its middle one foot section. This board section corresponded to the one foot region of the production line traversed by control device 25, and thus extended one foot in the cross direction and eight feet in the machine direction for each 4'×8' board formed by the cutting means 39a and 39b of the line. For each measured 4'×8' sample board, twelve thickness measurements were made along one of the one foot edges of the one foot section, twelve more along the other of the one foot edges, and a final twelve along a line midway between the two one foot edges. Each set of twelve measurements was made at the two side edges of the one foot section and at ten evenly spaced positions along the line extending between the two opposed side edges of the one foot section. The positions of the measurements proceeding from one side to the other of the one foot section are numbered 1 to 12 in Table I. Each reported thickness value for a given position in Table I is the average of the three measurements made for that position, i.e., one at each 1 foot edge and one at the point midway between the two edges. The mean of the twelve transverse thicknesses and the range from the lowest to the highest of these thicknesses are presented at the right in Table I.

Figure 5:
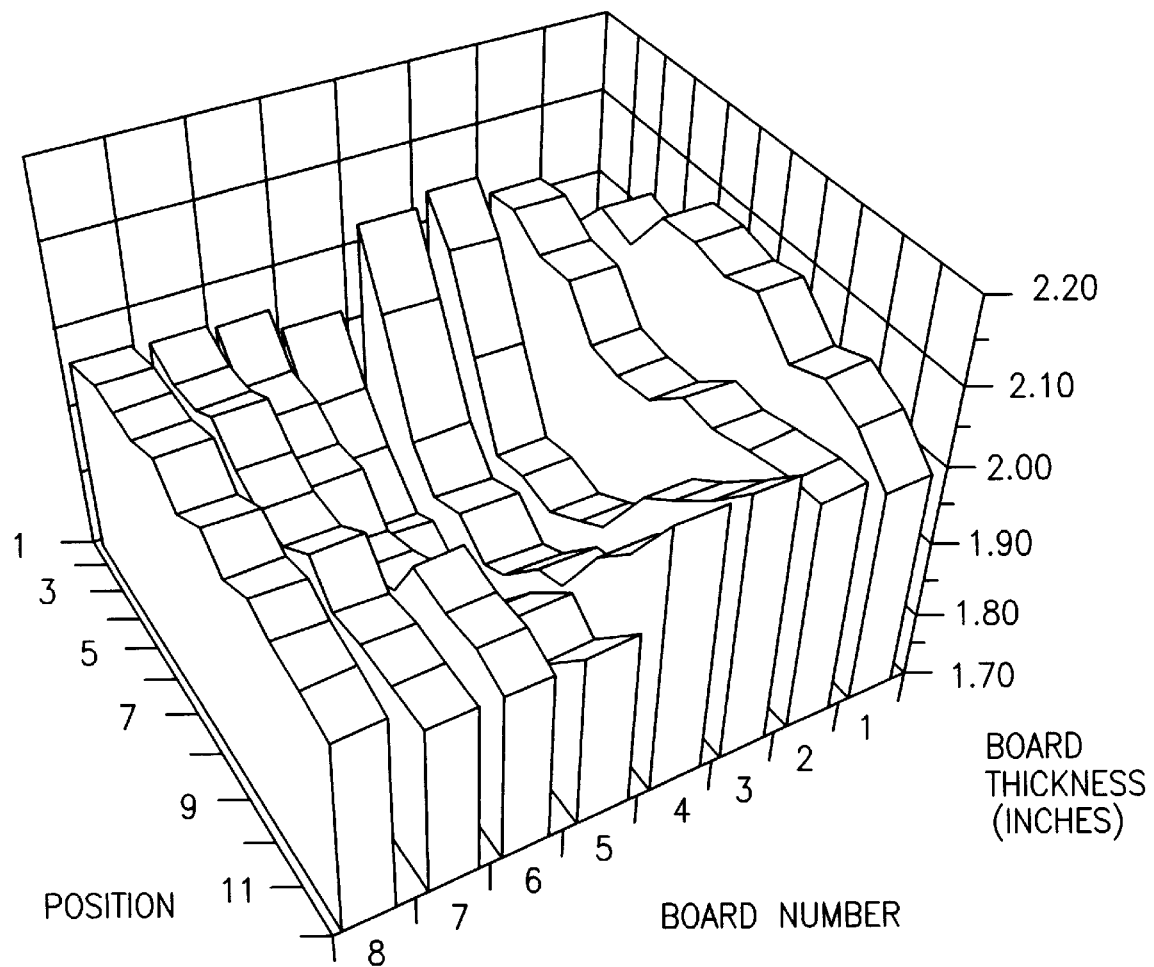
FIG. 5 is a 3-dimensional thickness profile of foam boards manufactured using a heated metering roll.

A 3-dimensional representation of the data of Table I is provided by FIG. 5 of the drawings. As shown in FIG. 5, the control device 25 operated to change the initial convex profile of the board product to a concave profile and then to the more even profile evident for Board Numbers 7 and 8, whose transverse thicknesses vary within the relatively narrow range of 0.04". The trial run was continued and the control settings for the heating zones of device 25 were adjusted to optimize board flatness.

After a period of production of the 1⅞" boards utilizing the optimized control settings, production was discontinued and metering roll 22 was set for production of 15/16" boards with use of the same isocyanurate formulation and trilaminate facing sheets used for the 1⅞" boards. Production was resumed and the control settings of device 25 were optimized to produce 15/16" boards whose central thickness profile was much flatter than that of 15/16" control boards produced with unheated device 25.

Various properties of control and treated board samples which were produced during the above-described manufacture of the 1⅞" and 15/16" boards are reported in Table II below. The control samples were produced without heating metering roll 22, while the treated samples were subjected to treatment by control device 25 after the above-mentioned optimization of its zone settings. The physical property data presented in Table II reveal that the use of control device 25 in foam production does not adversely affect the properties of the resulting foam boards.

TABLE I

TRANSVERSE THICKNESS MEASUREMENTS

| Board Number | Elapsed Time, min. | Position, Average Thickness (in) | | | | | | | | | | | | Thickness, Mean | Thickness, Range |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| 1 | 2 | 1.91 | 1.97 | 2.02 | 2.00 | 2.07 | 2.08 | 2.07 | 2.09 | 2.03 | 2.06 | 2.03 | 1.99 | 2.03 | 0.18 |
| 2 | 6 | 2.01 | 2.01 | 1.98 | 1.99 | 1.93 | 1.93 | 1.94 | 1.98 | 1.98 | 2.00 | 2.01 | 2.02 | 1.98 | 0.09 |
| 3 | 10 | 2.03 | 1.98 | 1.87 | 1.77 | 1.78 | 1.77 | 1.81 | 1.84 | 1.92 | 1.97 | 2.01 | 2.07 | 1.90 | 0.30 |
| 4 | 14 | 2.02 | 1.92 | 1.78 | 1.74 | 1.76 | 1.73 | 1.77 | 1.82 | 1.84 | 1.93 | 1.99 | 2.07 | 1.86 | 0.34 |
| 5 | 18 | 1.92 | 1.84 | 1.80 | 1.74 | 1.76 | 1.72 | 1.74 | 1.80 | 1.85 | 1.90 | 1.88 | 1.94 | 1.82 | 0.22 |
| 6 | 22 | 1.95 | 1.90 | 1.90 | 1.87 | 1.87 | 1.83 | 1.85 | 1.87 | 1.95 | 1.94 | 1.94 | 1.93 | 1.90 | 0.12 |
| 7 | 26 | 1.94 | 1.93 | 1.93 | 1.96 | 1.93 | 1.92 | 1.92 | 1.96 | 1.93 | 1.94 | 1.93 | 1.93 | 1.94 | 0.04 |
| 8 | 30 | 1.95 | 1.96 | 1.97 | 1.97 | 1.98 | 1.95 | 1.98 | 1.97 | 1.99 | 1.99 | 1.98 | 1.96 | 1.97 | 0.04 |

TABLE II

PROPERTIES OF INSULATION BOARDS

| Description | Nominal Thickness, in | Btu-in. (hr ft² °F.) | Closed Cells, % | Friability, % Wt. Loss | Dimensional Stability, −40° F., (M + T), % | Compressive Strength, psi | *Facer Adhesion |
|---|---|---|---|---|---|---|---|
| Control | 1 7/8 | 0.131 | 90.78 | 7.3 | −0.07 | 26.5 | Good |
| Treated | 1 7/8 | 0.130 | 89.67 | 6.2 | −0.09 | 26.9 | Good |
| Control | 15/16 | 0.125 | 90.90 | 4.4 | −0.02 | 27.5 | Good |
| Treated | 15/16 | 0.127 | 88.88 | 1.4 | −0.02 | 26.4 | Good |

*Facer checked at ambient conditions seven days after production.

We claim:

1. A method for the continuous manufacture of a plastic foam product comprising continuously conveying a carrier along a production line; depositing a foam-forming mixture on the carrier; passing the carrier and deposited mixture between two spaced opposed constricting members which lie one above the other and form therebetween a metering gap for distributing the mixture over the carrier, at least one of the constricting members being a horizontal rotatable roll, the roll being malleable through changes in temperatures so as to variously define the profile of the gap and thereby obtain a desired thickness of the mixture across the width of the carrier; controlling the temperature of the roll by selectively heating or cooling a plurality of axial zones along the roll to locally vary the diameter of the roll, the heating or cooling of the roll being accomplished by directing air from a source exterior to the roll toward the axial zones along the roll, the air being directed past a plurality of individually controlled heating elements situated exterior to the roll, each heating element being positioned proximate to one of the axial zones of the roll for regulation of the temperature of the air directed toward the zone; and allowing the mixture after passing through the gap to expand to produce a plastic foam.

2. The method of claim 1 wherein the carrier comprises a rigid or flexible material.

3. The method of claim 1 which includes the step of curing the deposited mixture in an oven downstream of the metering gap.

4. The method of claim 1 wherein the foam-forming mixture comprises a mixture for forming a rigid polymer foam selected from the group consisting of polyurethane and polyisocyanurate foams.

5. The method of claim 1 wherein an axial elongated cylindrical curved faceplate is positioned coaxially of the malleable roll with the front surface of the faceplate in close facing proximity to the outer surface of the roll, a plurality of openings being spaced axially along the faceplate, and plenum means being located in fluid communication with the openings and including the faceplate as a portion thereof, and the air is delivered from a blower means to the plenum means and through the openings, the heating elements being positioned behind the faceplate for selectively heating the air passing thereby and through the openings.

6. The method of claim 1 which includes sensing the thickness of the plastic foam product at a plurality of locations across the width of the product and producing signals corresponding to the thickness of the product at each of the locations, means responsive to the signals being provided for controlling the amount of power selectively supplied to each of the heating elements.

7. The method of claim 1 wherein the carrier comprises a lower facing sheet and an upper facing sheet is provided above the deposited mixture and the lower facing sheet at a point upstream of the metering gap, whereby a composite sandwich of the upper and lower facing sheets with the deposited mixture therebetween is passed through the gap and on downstream along the production line.

8. The method of claim 7 which includes the step of supplying at a point upstream of the metering gap at least one layer of reinforcing material between the upper and lower facing sheets, whereby a composite sandwich of the upper and lower facing sheets with the deposited mixture and reinforcing material therebetween is passed through the metering gap and on downstream along the production line.

9. The method of claim 7 wherein the upper constricting member is the malleable roll, the malleable roll being vertically shiftable for control of the thickness of the gap.

10. The method of claim 1 wherein the other constricting member comprises a horizontal rotatable roll.

11. The method of claim 10 wherein one or both of the rolls are vertically shiftable for control of the thickness of the gap.

12. The method of claim 10 wherein the malleable roll is the upper roll, the malleable roll being vertically shiftable for control of the thickness of the gap.

13. The method of claim 12 wherein the lower roll is also vertically shiftable for control of the thickness of the gap.

14. The method of claim 12 wherein the carrier comprises a lower facing sheet and an upper facing sheet is provided above the deposited mixture and the lower facing sheet at a point upstream of the metering gap, whereby a composite sandwich of the upper and lower facing sheets with the deposited mixture therebetween is passed through the gap and on downstream along the production line.

15. The method of claim 14 wherein an axial elongated cylindrical curved faceplate is positioned coaxially of the malleable roll with the front surface of the faceplate in close facing proximity to the outer surface of the roll, a plurality of openings being spaced axially along the faceplate, and plenum means being located in fluid communication with the openings and including the faceplate as a portion thereof, and the air is delivered from a blower means to the plenum means and through the openings, the heating elements being positioned behind the faceplate for selectively heating the air passing thereby and through the openings.

16. The method of claim 14 which includes sensing the thickness of the plastic foam product at a plurality of locations across the width of the product and producing signals corresponding to the thickness of the product at each of the locations, means responsive to the signals being provided for controlling the amount of power selectively supplied to each of the heating elements.

17. The method of claim 14 which includes the step of supplying at a point upstream of the metering gap at least one layer of reinforcing material between the upper and lower facing sheets, whereby a composite sandwich of the upper and lower facing sheets with the deposited mixture and reinforcing material therebetween is passed through the metering gap and on downstream along the production line.

18. The method of claim 17 wherein the reinforcing material comprises a material which is nonflammable and dimensionally stable.

19. The method of claim 14 which includes the step of curing the deposited mixture in an oven downstream of the metering gap.

20. The method of claim 19 wherein the foam-forming mixture comprises a mixture for forming a rigid polymer foam selected from the group consisting of polyurethane and polyisocyanurate foams.

* * * * *